(12) United States Patent
Ong et al.

(10) Patent No.: US 9,800,473 B2
(45) Date of Patent: Oct. 24, 2017

(54) NETWORK BASED VIRTUAL COLLABORATIVE PROBLEM SOLVING SPACE

(71) Applicant: AppDynamics LLC, San Francisco, CA (US)

(72) Inventors: Rey Ong, San Francisco, CA (US); Valeriy Chibisov, San Francisco, CA (US)

(73) Assignee: AppDynamics LLC, San Francisco, CA (US)

(*) Notice: Subject to any disclaimer, the term of this patent is extended or adjusted under 35 U.S.C. 154(b) by 0 days.

(21) Appl. No.: 14/610,747

(22) Filed: Jan. 30, 2015

(65) Prior Publication Data

US 2016/0226719 A1    Aug. 4, 2016

(51) Int. Cl.
*H04L 12/24* (2006.01)
*G06F 3/0484* (2013.01)
*G06F 9/44* (2006.01)
*G06Q 10/10* (2012.01)

(52) U.S. Cl.
CPC .......... *H04L 41/22* (2013.01); *G06F 3/0484* (2013.01); *G06F 9/4443* (2013.01); *G06Q 10/101* (2013.01)

(58) Field of Classification Search
CPC ...... H04L 41/22; H04L 43/045; G06F 3/0484
See application file for complete search history.

(56) References Cited

U.S. PATENT DOCUMENTS

| | | | |
|---|---|---|---|
| 6,507,845 B1* | 1/2003 | Cohen et al. | 707/608 |
| 2002/0049786 A1* | 4/2002 | Bibliowicz | G06F 3/0481 715/211 |
| 2002/0169734 A1* | 11/2002 | Giel et al. | 706/45 |
| 2007/0101297 A1* | 5/2007 | Forstall et al. | 715/841 |
| 2012/0023418 A1* | 1/2012 | Frields et al. | 715/756 |
| 2012/0266074 A1* | 10/2012 | Bhoovaraghavan | G06F 11/32 715/738 |
| 2014/0304407 A1* | 10/2014 | Moon | 709/224 |
| 2014/0325337 A1* | 10/2014 | McWeeney | H04L 67/02 715/234 |

* cited by examiner

*Primary Examiner* — Li Sun
(74) *Attorney, Agent, or Firm* — Parker Ibrahim & Berg LLC; James M. Behmke; Stephen D. LeBarron

(57) ABSTRACT

The present technology utilizes agents to monitor and report data from Java virtual machines (JVM) to a controller as part of application performance monitoring. When a JVM is loaded, code defining an interface for agents is loaded as well. A determination may be made as to whether the loaded agent implements the interface defined at the JVM. If the loaded agent does not implement the interface, for example if it is missing one or more methods defined by the interface, the agent class may be modified to define the missing methods. The modification to the agent class may be made after compilation but before the class is loaded into the JVM.

18 Claims, 10 Drawing Sheets

NETWORK BASED VIRTUAL COLLABORATIVE PROBLEM SOLVING SPACE

BACKGROUND OF THE INVENTION

The World Wide Web has expanded to provide web services faster to consumers. Web services may be provided by a web application which uses one or more services to handle a transaction. The applications may be distributed over several machines, making the topology of the machines that provides the service more difficult to track and monitor.

When a distributed application has a performance issue, it may require more than one person to diagnose the cause and determine a solution. Gathering several people to diagnose a performance issue for a network application can be difficult. People are often in different locations and working from different computers. Problem solving performed over the phone, or using a network-based meeting service, makes it very difficult to collaborate ideas and determine solutions to performance issues in complex applications.

There is a need in the art for providing an improved collaboration system for working through performance issues in network based systems.

SUMMARY

The present technology provides a network-based collaborative problem solving space. The space may be considered a "virtual war room" that allows people to collaborate on a performance issue of a system being monitored by an application performance monitoring system. The virtual collaboration space may provide a virtual space for viewing streaming time series data related to an identified performance issue for a distributed business transaction. The virtual collaboration space may be initiated using a template that provides widgets of information associated with the performance issue. Multiple users can participate in the virtual collaboration space, configure widgets based on streaming data or metrics, post notes, invite others, and perform other functionality.

An embodiment may include a method for providing a virtual collaboration space. The method may receive a request by a server to initiate a collaborative interface based on a performance issue for a distributed business transaction executed over a plurality of servers. A collaborative interface template may be retrieved which is associated with the selected performance issue. One or more widgets of the retrieved template may be populated with data associated with the selected performance issue, the data including streaming time series data. Input may be received into the collaborative interface from a plurality of computers at remote locations. A first widget of the one or more widgets may be automatically updated based on the streaming time series data.

An embodiment may include a system for monitoring a business transaction. The system may include a processor, memory and one or more modules stored in memory and executable by the processor. When executed, the one or more modules may receive a request by a server to initiate a collaborative interface based on a performance issue for a distributed business transaction executed over a plurality of servers, retrieve a collaborative interface template associated with the selected performance issue, populate one or more widgets of the retrieved template with data associated with the selected performance issue, the data including streaming time series data, receive input into the collaborative interface from a plurality of computers at remote locations, and automatically update a first widget of the one or more widgets based on the streaming time series data.

DETAILED DESCRIPTION

The present technology provides a network-based collaborative problem solving space. The space may be considered a "virtual war room" that allows people to collaborate on a performance issue of a system being monitored by an application performance monitoring system. The virtual war room or collaboration space may provide a virtual space for viewing streaming time series data related to an identified performance issue for a distributed business transaction. The virtual collaboration space may be initiated using a template that provides widgets of information associated with the performance issue. Multiple users can participate in the virtual collaboration space, configure widgets based on streaming data or metrics, post notes, invite others, and perform other functionality.

Figure 1:
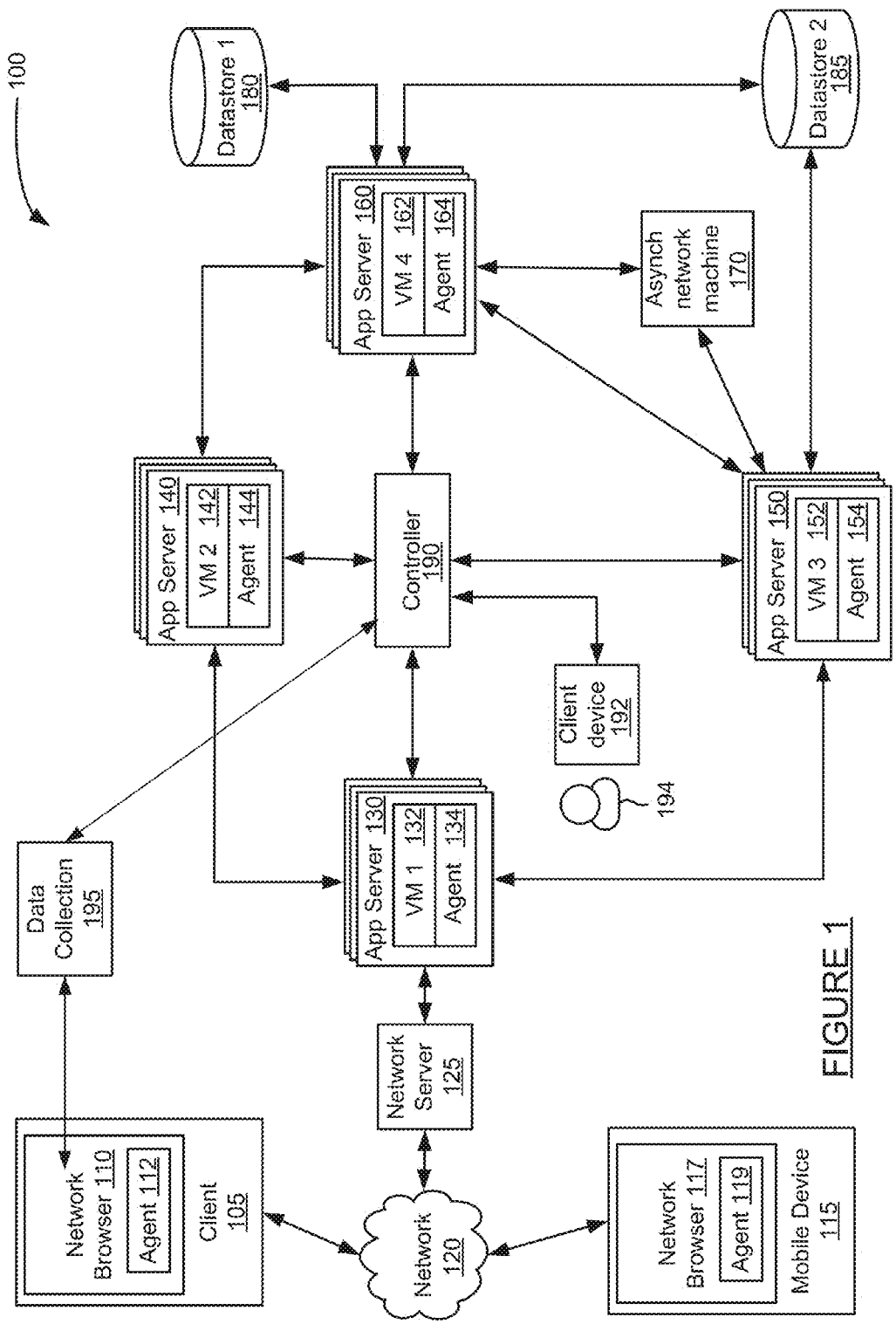
FIG. 1 is a block diagram of an exemplary system for monitoring a distributed application.

FIG. 1 is a block diagram of a system for monitoring a distributed application. The system of FIG. 1 may be monitored by one or more agents, data may be collected during the monitoring, and performance issues may be identified for the distributed application. A virtual war room may be initiated to address the identified performance issue.

System 100 of FIG. 1 includes client device 105 and 192, mobile device 115, network 120, network server 125, application servers 130, 140, 150 and 160, asynchronous network machine 170, data stores 180 and 185, and controller 190.

Client device 105 may include network browser 110 and be implemented as a computing device, such as for example a laptop, desktop, workstation, or some other computing device. Network browser 110 may be a client application for viewing content provided by an application server, such as application server 130 via network server 125 over network 120. Mobile device 115 is connected to network 120 and may be implemented as a portable device suitable for receiving content over a network, such as for example a mobile phone, smart phone, tablet computer or other portable device. Both client device 105 and mobile device 115 may include hardware and/or software configured to access a web service provided by network server 125.

Network 120 may facilitate communication of data between different servers, devices and machines. The network may be implemented as a private network, public network, intranet, the Internet, a Wi-Fi network, cellular network, or a combination of these networks.

Network server 125 is connected to network 120 and may receive and process requests received over network 120. Network server 125 may be implemented as one or more servers implementing a network service. When network 120 is the Internet, network server 125 may be implemented as a web server. Network server 125 and application server 130 may be implemented on separate or the same server or machine.

Application server 130 communicates with network server 125, application servers 140 and 150, controller 190. Application server 130 may also communicate with other machines and devices (not illustrated in FIG. 1). Application server 130 may host an application or portions of a distributed application and include a virtual machine 132, agent 134, and other software modules. Application server 130 may be implemented as one server or multiple servers as illustrated in FIG. 1, and may implement both an application server and network server on a single machine.

Application server 130 may include applications in one or more of several platforms. For example, application server 130 may include a Java application, .NET application, PHP application, C++ application, AJAX, or other application. Different platforms are discussed below for purposes of example only.

Virtual machine 132 may be implemented by code running on one or more application servers. The code may implement computer programs, modules and data structures to implement, for example, a virtual machine mode for executing programs and applications. In some embodiments, more than one virtual machine 132 may execute on an application server 130. A virtual machine may be implemented as a Java Virtual Machine (JVM). Virtual machine 132 may perform all or a portion of a business transaction performed by application servers comprising system 100. A virtual machine may be considered one of several services that implement a web service.

Virtual machine 132 may be instrumented using byte code insertion, or byte code instrumentation, to modify the object code of the virtual machine. The instrumented object code may include code used to detect calls received by virtual machine 132, calls sent by virtual machine 132, and communicate with agent 134 during execution of an application on virtual machine 132. Alternatively, other code may be byte code instrumented, such as code comprising an application which executes within virtual machine 132 or an application which may be executed on application server 130 and outside virtual machine 132.

Agent 134 on application server 130 may be installed on application server 130 by instrumentation of object code, downloading the application to the server, or in some other manner. Agent 134 may be executed to monitor application server 130, monitor virtual machine 132, and communicate with byte instrumented code on application server 130, virtual machine 132 or another application or program on application server 130. Agent 134 may detect operations such as receiving calls and sending requests by application server 130 and virtual machine 132. Agent 134 may receive data from instrumented code of the virtual machine 132, process the data and transmit the data to controller 190. Agent 134 may perform other operations related to monitoring virtual machine 132 and application server 130 as discussed herein. For example, agent 134 may identify other applications, share business transaction data, aggregate detected runtime data, and other operations.

Agent 134 may be a Java agent, .NET agent, PHP agent, or some other type of agent, for example based on the platform which the agent is installed on.

Each of application servers 140, 150 and 160 may include an application and an agent. Each application may run on the corresponding application server or a virtual machine. Each of virtual machines 142, 152 and 162 on application servers 140-160 may operate similarly to virtual machine 132 and host one or more applications which perform at least a portion of a distributed business transaction. Agents 144, 154 and 164 may monitor the virtual machines 142-162 or other software processing requests, collect and process data at runtime of the virtual machines, and communicate with controller 190. The virtual machines 132, 142, 152 and 162 may communicate with each other as part of performing a distributed transaction. In particular each virtual machine may call any application or method of another virtual machine.

Asynchronous network machine 170 may engage in asynchronous communications with one or more application servers, such as application server 150 and 160. For example, application server 150 may transmit several calls or messages to an asynchronous network machine. Rather than communicate back to application server 150, the asynchronous network machine may process the messages and eventually provide a response, such as a processed message, to application server 160. Because there is no return message from the asynchronous network machine to application server 150, the communications between them are asynchronous.

Data stores 180 and 185 may each be accessed by application servers such as application server 150. Data store 185 may also be accessed by application server 150. Each of data stores 180 and 185 may store data, process data, and return queries received from an application server. Each of data stores 180 and 185 may or may not include an agent.

Controller 190 may control and manage monitoring of business transactions distributed over application servers 130-160. Controller 190 may receive runtime data from each of agents 134-164, associate portions of business transaction data, communicate with agents to configure collection of runtime data, and provide performance data and reporting through an interface. The interface may be viewed as a web-based interface viewable by mobile device 115, client device 105, or some other device. In some embodiments, a client device 192 may directly communicate with controller 190 to view an interface for monitoring data.

Controller 190 may install an agent into one or more virtual machines and/or application servers 130. Controller 190 may receive correlation configuration data, such as an object, a method, or class identifier, from a user through client device 192.

Controller 190 may collect and monitor customer usage data collected by agents on customer application servers and analyze the data. The controller may report the analyzed data via one or more interfaces, including but not limited to a dashboard interface and one or more reports.

Data collection server 195 may communicate with client 105, 115 (not shown in FIG. 1), and controller 190, as well as other machines in the system of FIG. 1. Data collection server 195 may receive data associated with monitoring a client request at client 105 (or mobile device 115) and may store and aggregate the data. The stored and/or aggregated data may be provided to controller 190 for reporting to a user.

Figure 2:
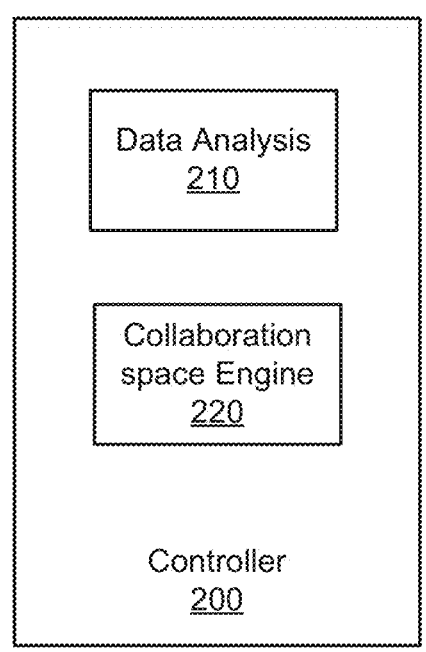
FIG. 2 is a block diagram of a controller.

FIG. 2 is a block diagram of a controller. Controller 200 includes data analysis module 210 and virtual war room engine 220. Data analysis module 210 may receive data from one or more agents installed on one more remote machines implementing a distributed business transaction. Data analysis module 210 may analyze the data to determine performance issues in portions of the distributed business transaction, such as a particular node, tier, application, method of other portion in the dynamic execution path of the business application.

Collaboration space engine 220 may provide the collaborative space for problem solving a detected performance issue. The collaboration space engine 220 may load a template associated with the performance issue and populate the template with widgets and data associated with the performance issue. For example, for a backend performance issue, a template associated with the backend performance issue may include a graphical representation of streaming time series data for response times of the backend, an indication of the CPU usage, and the violation of any health rules that apply to the backend.

Figure 3:
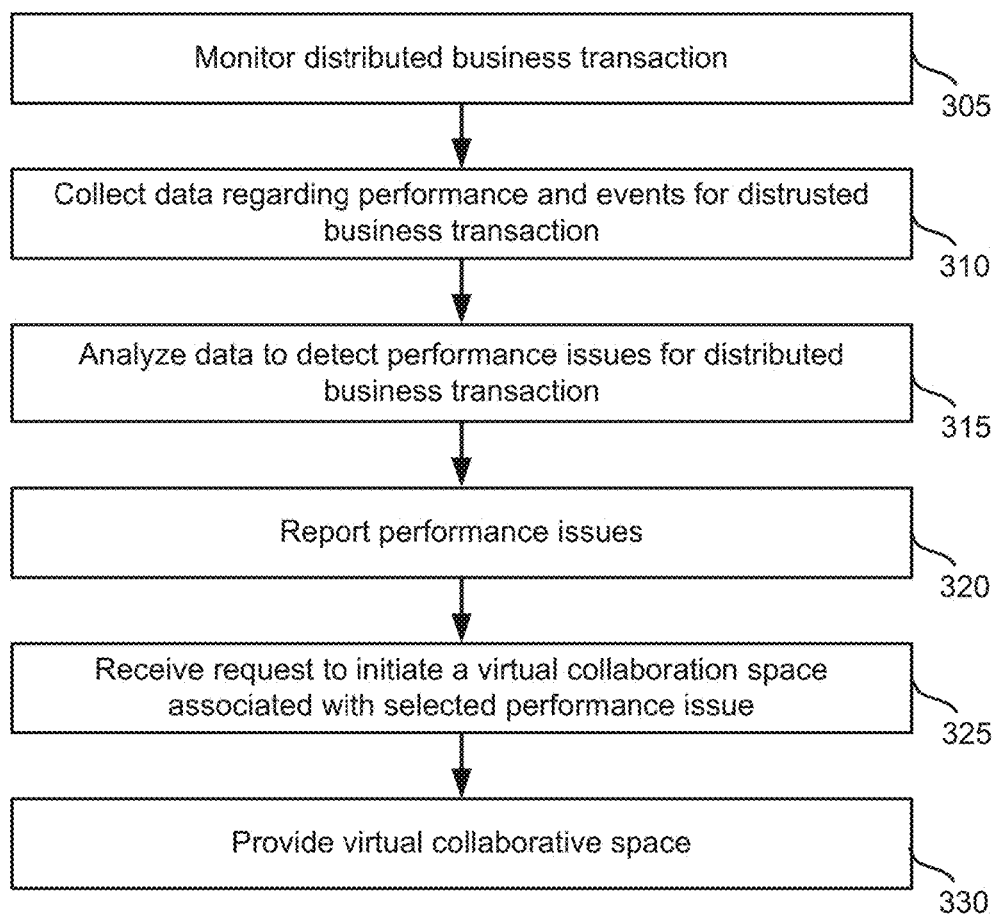
FIG. 3 is a method for initiating a virtual war room.

FIG. 3 is a method for initiating a virtual war room. First, a distributed business transaction may be monitored at step 305. The monitoring may be performed by one or more agents installed on one or more servers that implement the distributed business transaction.

Data regarding performance and events for the distributed business transaction may be collected at step 310. The data may be collected by agents on the servers implementing the transaction and reported to a controller by each agent. The reported data may or may not be aggregated.

The collected data may be analyzed by the controller to detect any performance issues for distributed business transaction. A performance issue may be determined, for example, as a portion of the transaction that is determined to be slower than a baseline average time for that portion to complete, an error condition, an unresponsive application or machine, or some other issue with performance of the distributed business transaction.

The performance issues may be reported at step 320. Reporting the performance issues may include providing a list of issues found in the business transaction, a graphical representation of the issues, or some other communication of the issues.

Figure 5:
FIG. 5 is an interface for initiating a virtual war room for a performance issue.

A request to initiate a virtual collaboration space is received by the controller at step 325. In some instances, the request can be received through a selection received through an interface. FIG. 5 is an interface for initiating a virtual war room for a performance issue. The interface of FIGURE includes a list of performance issues with column data such as type, summary and time. Also included is a graphical indicator providing a severity level for each performance issue. In the example of FIG. 5, when a user positions a mouse over a line associated with a performance issue and provides input such as a mouse right click, a menu of selectable options may appear. The menu may include a selection that initiates a virtual collaboration space (i.e., virtual war room).

Once the request to initiate the virtual collaboration space is received, the space may be provided at step 330. Providing the virtual collaboration space may include loading a template with widgets, providing war room functionality to participants, and saving the resulting virtual collaboration space as a template. More details for providing the virtual collaborative space is discussed with respect to the method of FIG. 4.

Figure 4:
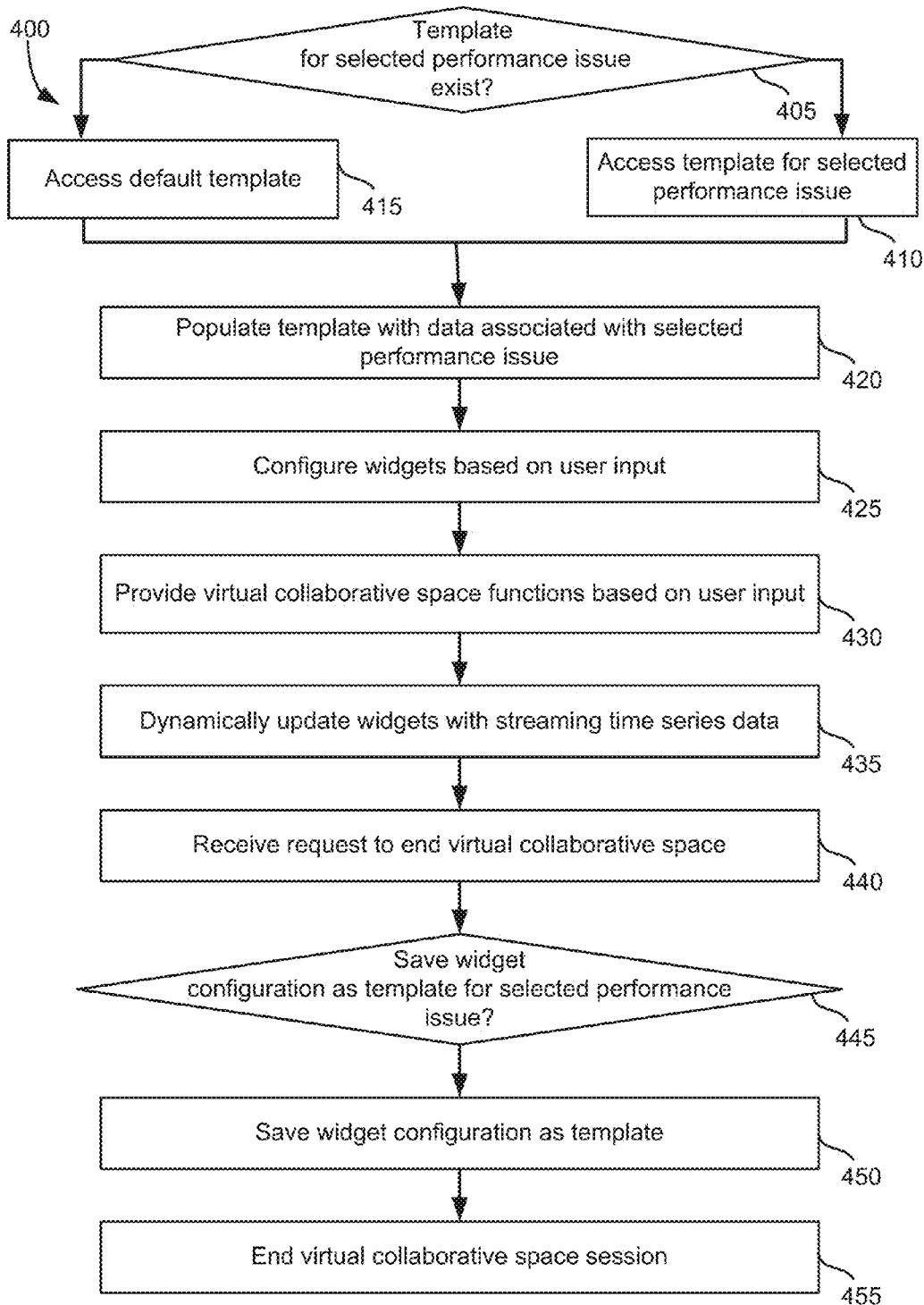
FIG. 4 is a method for managing a virtual war room.

FIG. 4 is a method for managing a virtual war room. The method of FIG. 4 provides more detail for step 330 of the method of FIG. 3. A determination is made as to whether a virtual collaboration space template exists for the selected performance issue. If no template exists, a default template is loaded into the virtual space at step 415. The virtual space may be an empty virtual space or pre-loaded with one or more widgets that may be commonly used for many performance issues. The method then continues to step 420. If a template does exist, the template for the selected performance issue is accessed at step 410 and the method continues to step 420.

The template, if any, is populated with data associated with selected performance issue data at step 420. The data may include streaming time series data that dynamically updates within the template. The template may also include one or more widgets that were found helpful by one or more people who addressed the selected performance issue previously.

Widgets are configured based on user input at step 425. Configuring a widget may include selecting the particular widget and data type to display by the widget (streaming time series or metric), selecting the source of the data to display in the widget, and other configuration.

Figure 6:
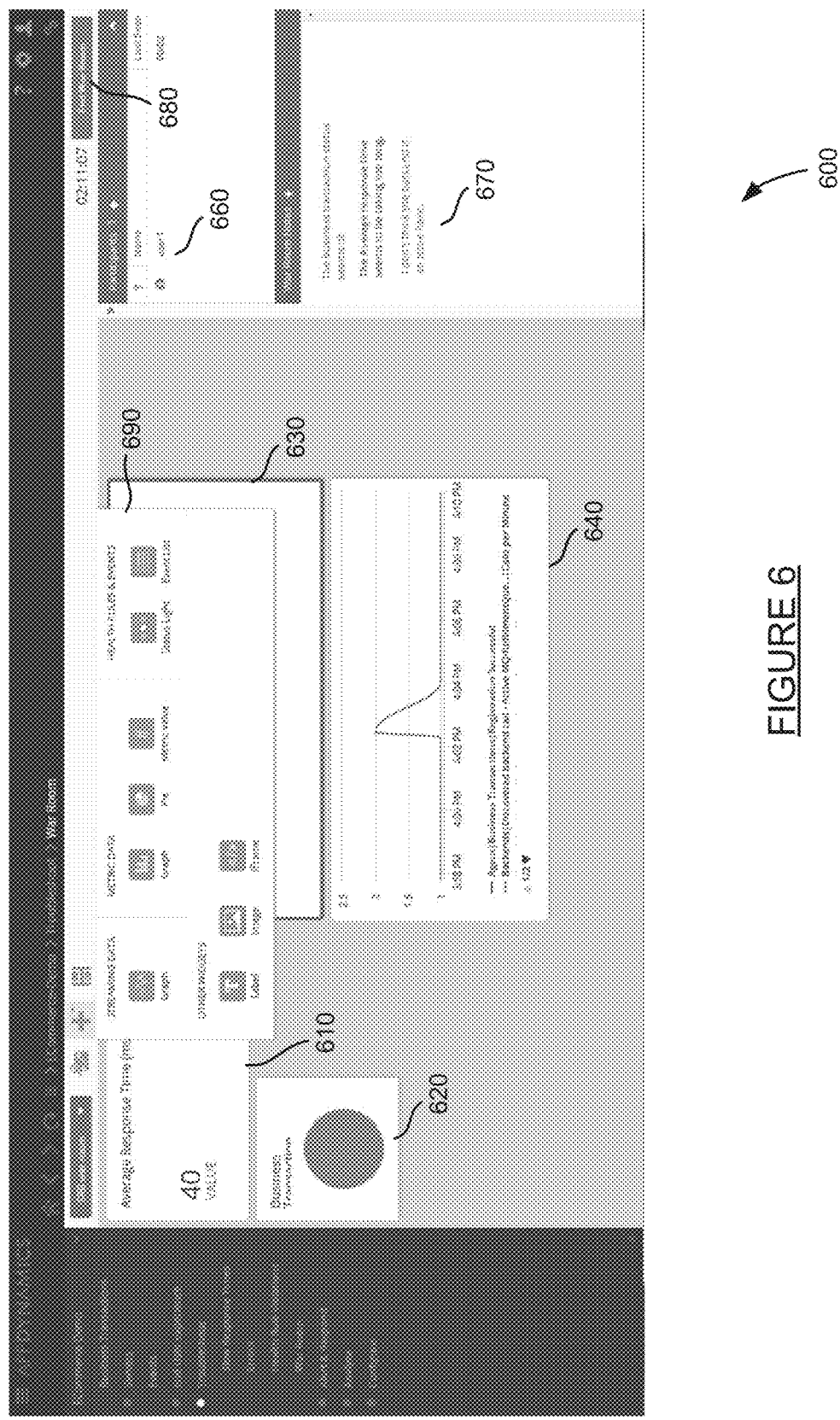
FIG. 6 is an interface for adding a widget to a virtual war room.

FIG. 6 is an interface for adding a widget to a virtual war room. The interface 600 includes a widget selection menu 690 and exemplary widgets 610, 620, 630, and 640. When a widget is dragged from menu 690, it appears on the virtual space of interface 600. When the new widget is then selected, options for populating the new widget with data are provided. The options include selecting an application, a timer series or metric, and other data to enable the widget to supply data.

The widgets in interface 600 may each display different data related to a performance issue. For example, widget 610 is a single metric display, widget 620 is a status light, and widget 630 is a streaming time series graph. Widget 640 also provides streaming time series data in graphical format.

Virtual collaboration space functionality is provided based on user input at step 430. The functionality may include chatting, sharing a link to the virtual space, passing or sharing membership with another participant, and other features.

In the interface of FIG. 6, chatting conversations between participants are shown in portion 670 of the interface. The chatting may be configured such that anyone in the virtual space may chat, and messages that are positive are in green ("The business transaction status seems ok"), messages that are negative are in red ("The average response time seems to be taking too long"), and neutral messages are in grey ("I don't think the backend is an issue here.")

Figure 7:
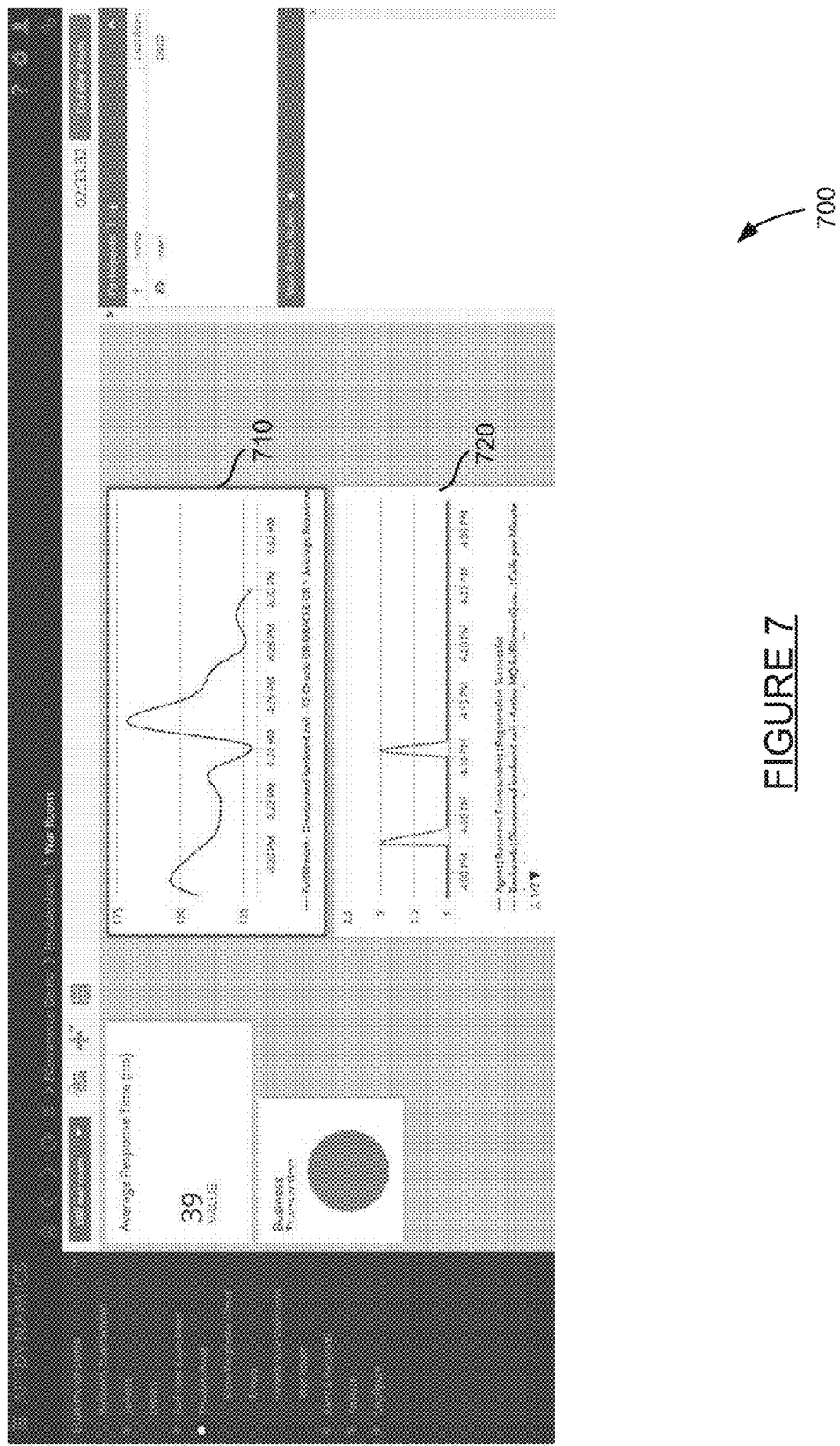
FIG. 7 is an interface providing dynamic time series data at a first point in time.

Widgets may be dynamically updated with time series data at step 435. The data provided in the widget will change over time as the streaming data collected and provided by the controller changes. FIG. 7 is an interface providing dynamic time series data at a first point in time. In interface 700, a first time series graph 710 and second time series graph illustrate data at a first period of time. The data in interface 700 has a time window from about 4:00 PM-4:30 pm.

Figure 8:
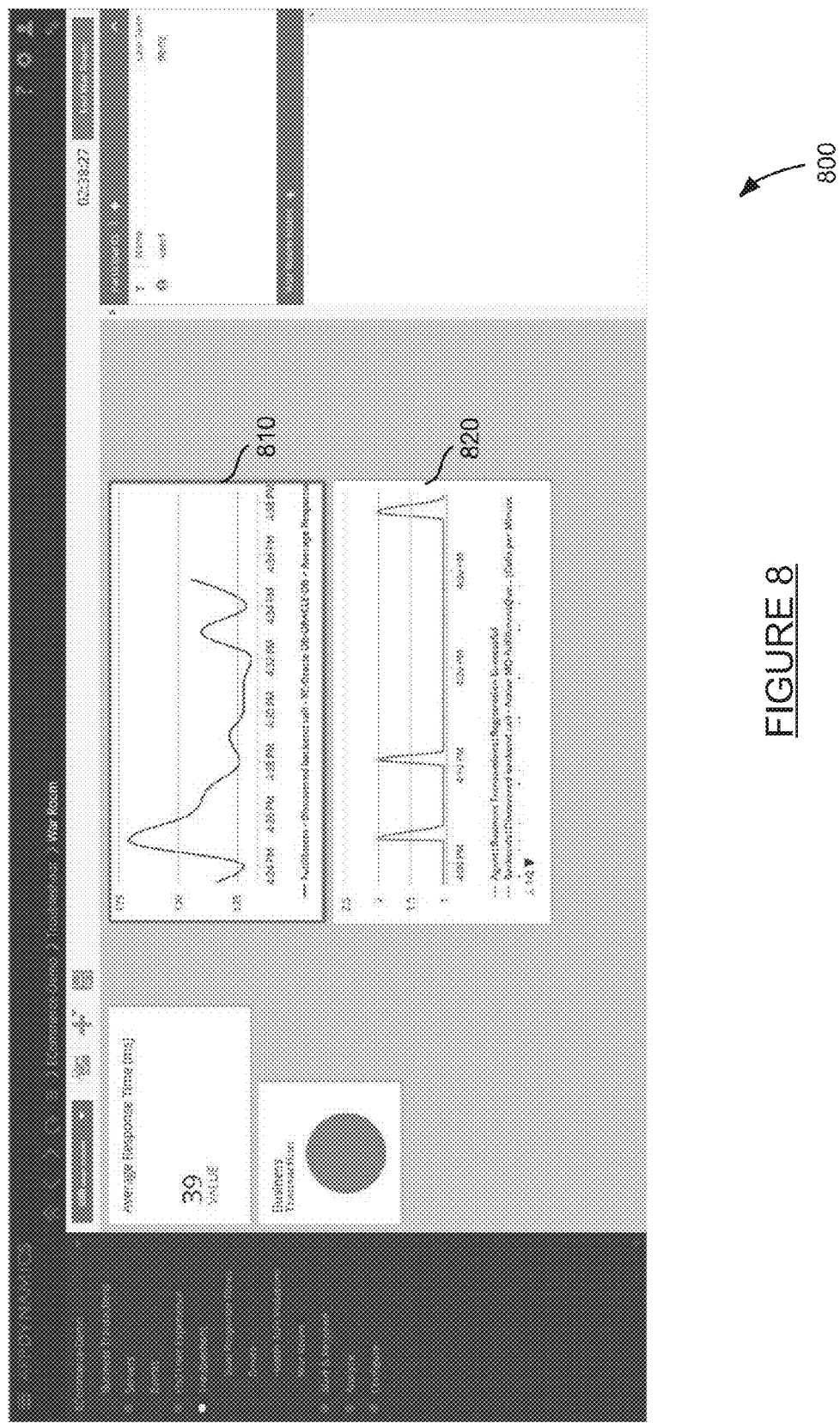
FIG. 8 is an interface providing dynamic time series data at a second point in time.

FIG. 8 is an interface providing dynamic time series data at a second point in time. The interface 800 is the same interface as that in FIG. 7 but includes data is more up to date—the provided data has a time window of between 4:24 and 4:35 pm or 5:00 pm. As can be seen, there may be a visually detectable change in time series data Returning to FIG. 4, a request to end the virtual collaborate room is received at step 440. A determination may be made as to whether a widget configuration should be saved as a template for selected performance issue at step 445. If the widget configuration should not be saved, the virtual collaboration space ends without saving a template at step 455. If the widget configuration should be saved as a template, the template is saved with an association to the particular performance issue at step 450. The virtual collaboration space then ends at step 455.

Figure 9:
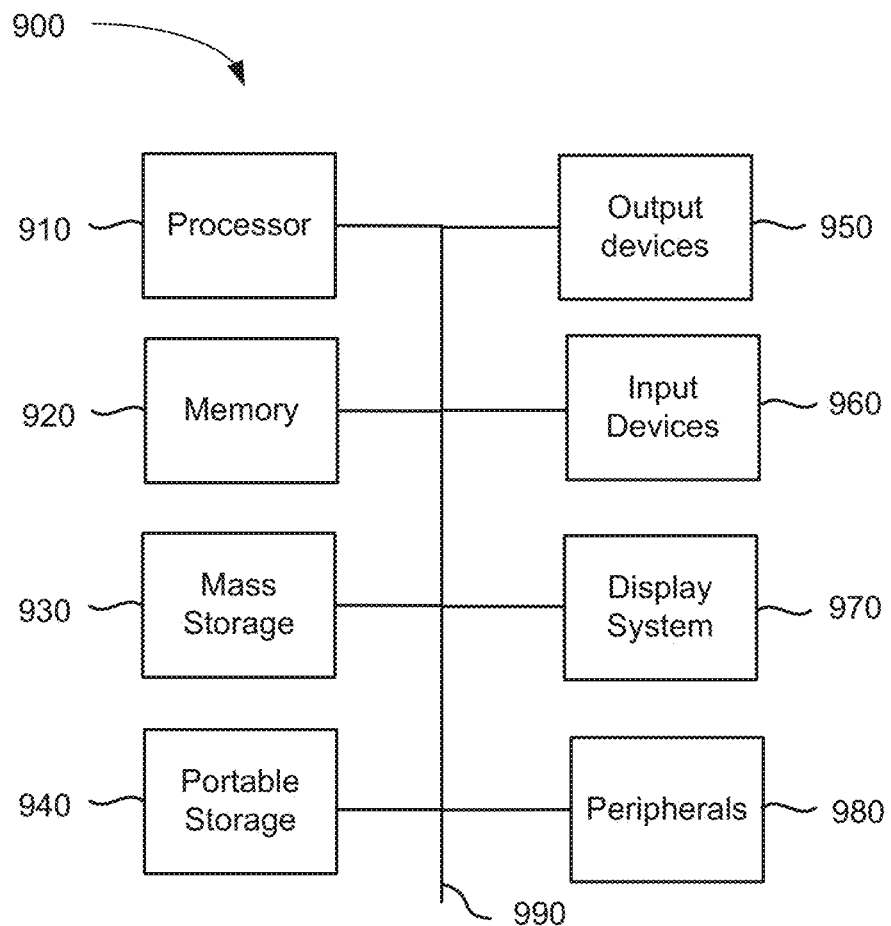
FIG. 9 is a block diagram of an exemplary system for implementing a computing device.

FIG. 9 illustrates an exemplary computing system 900 that may be used to implement a computing device for use with the present technology. System 900 of FIG. 9 may be implemented in the contexts of the likes of clients 105 and 192, network server 125, application servers 130-160, data stores 180-185, and controller 190. The computing system 900 of FIG. 9 includes one or more processors 994 and memory 94. Main memory 994 stores, in part, instructions and data for execution by processor 94. Main memory 994 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 94 and main memory 94 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 94. Mass storage device 930 can store the system software for implementing embodiments of the present invention for purposes of loading that software into main memory 94.

Portable storage device 940 operates in conjunction with a portable non-volatile storage medium, such as a floppy disk, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information, and processes the information for output to the display device.

Peripherals 980 may include any type of computer support device to add additional functionality to the computer system. For example, peripheral device(s) 980 may include a modem or a router.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

Figure 10:
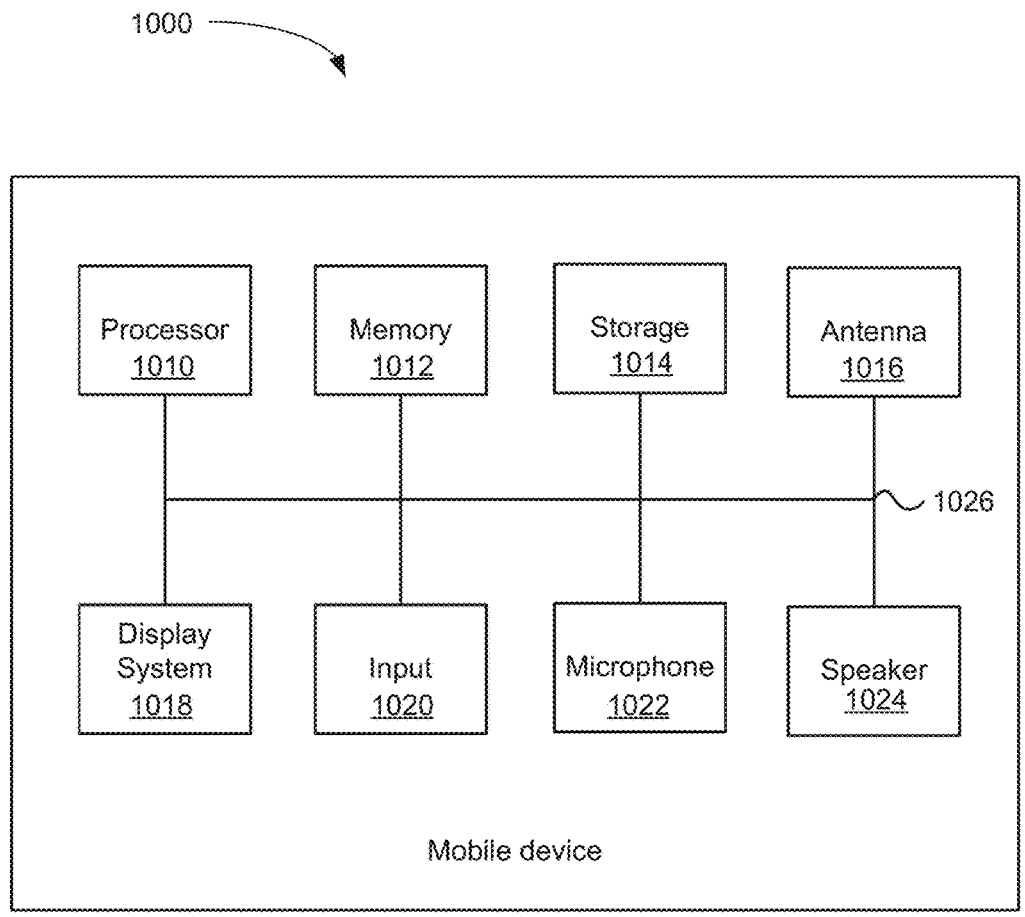
FIG. 10 is a block diagram of an exemplary system for implementing a mobile device.

FIG. 10 illustrates an exemplary mobile device system 1000 that may be used to implement a mobile device for use with the present technology, such as for mobile device 115. The mobile device 1000 of FIG. 10 includes one or more processors 105 and memory 1012. Memory 1012 stores, in part, programs, instructions and data for execution and processing by processor 105. The system 1000 of FIG. 10 further includes storage 1014, one or more antennas 1016, a display system 1018, inputs 1020, one or more microphones 1022, and one or more speakers 1024.

The components shown in FIG. 10 are depicted as being connected via a single bus 1026. However, the components 105-524 may be connected through one or more data transport means. For example, processor unit 105 and main memory 1012 may be connected via a local microprocessor bus, and storage 1014, display system 1018, input 1020, and microphone 1022 and speaker 1024 may be connected via one or more input/output (I/O) buses.

Memory 1012 may include local memory such as RAM and ROM, portable memory in the form of an insertable memory card or other attachment (e.g., via universal serial bus), a magnetic disk drive or an optical disk drive, a form of FLASH or PROM memory, or other electronic storage medium. Memory 1012 can store the system software for implementing embodiments of the present invention for purposes of loading that software into main memory 105.

Antenna 1016 may include one or more antennas for communicating wirelessly with another device. Antenna 1016 may be used, for example, to communicate wirelessly via Wi-Fi, Bluetooth, with a cellular network, or with other wireless protocols and systems. The one or more antennas may be controlled by a processor 105, which may include a controller, to transmit and receive wireless signals. For example, processor 105 execute programs stored in memory 1012 to control antenna 1016 transmit a wireless signal to a cellular network and receive a wireless signal from a cellular network.

Display system 1018 may include a liquid crystal display (LCD), a touch screen display, or other suitable display device. Display system 1070 may be controlled to display textual and graphical information and output to text and graphics through a display device. When implemented with a touch screen display, the display system may receive input and transmit the input to processor 105 and memory 1012.

Input devices 1020 provide a portion of a user interface. Input devices 1060 may include an alpha-numeric keypad, such as a keyboard, for inputting alpha-numeric and other information, buttons or switches, a trackball, stylus, or cursor direction keys.

Microphone 1022 may include one or more microphone devices which transmit captured acoustic signals to processor 105 and memory 1012. The acoustic signals may be processed to transmit over a network via antenna 1016.

Speaker 1024 may provide an audio output for mobile device 1000. For example, a signal received at antenna 1016 may be processed by a program stored in memory 1012 and executed by processor 105. The output of the executed program may be provided to speaker 1024 which provides audio. Additionally, processor 105 may generate an audio signal, for example an audible alert, and output the audible alert through speaker 1024.

The mobile device system 1000 as shown in FIG. 10 may include devices and components in addition to those illustrated in FIG. 10. For example, mobile device system 1000 may include an additional network interface such as a universal serial bus (USB) port.

The components contained in the computer system 1000 of FIG. 10 are those typically found in mobile device systems that may be suitable for use with embodiments of the present invention and are intended to represent a broad category of such mobile device components that are well known in the art. Thus, the computer system 1000 of FIG. 10 can be a cellular phone, smart phone, hand held computing device, minicomputer, or any other computing device. The mobile device can also include different bus configurations, networked platforms, multi-processor platforms, etc. Various operating systems can be used including Unix, Linux, Windows, Macintosh OS, Google OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for providing a virtual collaboration interface for collaboratively problem solving a performance issue, the method including:
   receiving, by a collection server, data from agents installed on servers that implement a distributed business transaction, the data associated with performance of the distributed business transaction;
   analyzing, by the collection server, the received data to detect performance issues for the distributed business transaction;
   reporting the detected performance issues including displaying the detected performance issues in a list and a graphical indicator providing a severity level for each performance issue;
   receiving, from a remote computer, a selection of one of the displayed performance issues in the list and a request to initiate a virtual collaborative interface for the selected performance issue;
   in response to receiving the request, dynamically determining whether a template exists for displaying the virtual collaborative interface specifically for the selected performance issue;
   in response to the determining, displaying the virtual collaborative interface using a default template when a template does not exist for the selected performance issue and displaying the virtual collaborative interface using an existing template when a template does exist for the selected performance issue;
   pre-loading the default template with one or more widgets or the existing template with one or more widgets previously selected while collaboratively problem solving the same performance issue previously;
   populating the pre-loaded one or more widgets in the displayed default template or the existing template with corresponding data from the analyzed data associated with the selected performance issue, the corresponding data populating the pre-loaded one or more widgets associated with the selected performance issue, the data including streaming time series data;
   receiving input into the virtual collaborative interface from computers at remote locations to collaboratively modify the default or existing template including adding a new widget, modifying the one or more previously selected widgets, or removing the one or more previously selected widgets from the displayed default template or existing template;
   modifying the virtual collaborative interface in response to the input received into the virtual collaborative interface from the computers at remote locations;
   dynamically updating the added or modified widgets with corresponding streaming time series data from the analyzed data associated with the selected performance issue based on the addition or modification; and
   determining whether to save a configuration of the collaboratively modified default or existing template.

2. The method of claim 1, including providing a chat functionality.

3. The method of claim 1, wherein the widgets include a graph for metrics data and a graph of dynamically streaming time series data.

4. The method of claim 1, including providing note data received from the computers at remote locations, the note data visually configured to represent a status communicated in a note text.

5. The method of claim 3, wherein dynamically updating the added or modified widgets includes scrolling the graph of dynamically streaming time series data along an axis as streaming time series data is received.

6. The method of claim 1, including:
   saving the configuration of the widgets so as to automatically pre-load the configuration in response to a future selection of the selected performance issue.

7. A non-transitory computer-readable storage medium having embodied thereon a program, the program being executable by a processor to perform operations for providing a virtual collaboration, the operations including:
   receiving, by a collection server, data from agents installed on servers that also include applications that perform a distributed business transaction, the data associated with performance of the distributed business transaction;
   analyzing, by the collection server, the received data to detect performance issues for the distributed business transaction;
   reporting the detected performance issues including displaying the detected performance issues in a list and a graphical indicator providing a severity level for each performance issue;
   receiving, from a remote computer, a selection of one of the displayed performance issues in the list and a request to initiate a virtual collaborative interface for the selected performance issue;
   in response to receiving the request, dynamically determining whether a template exists for displaying the virtual collaborative interface specifically for the selected performance issue;
   in response to the determining, displaying the virtual collaborative interface using a default template when a template does not exist for the selected performance issue and displaying the virtual collaborative interface using an existing template when a template does exist for the selected performance issue;

pre-loading the default template with one or more widgets or the existing template with one or more widgets previously selected while collaboratively problem solving the same performance issue previously;

populating the pre-loaded one or more widgets in the displayed default template or the existing template with corresponding data from the analyzed data associated with the selected performance issue, the corresponding data populating the pre-loaded one or more widgets associated with the selected performance issue, the data including streaming time series data;

receiving input into the virtual collaborative interface from computers at remote locations to collaboratively modify the default or existing template including adding a new widget, modifying the one or more previously selected widgets, or removing the one or more previously selected widgets from the displayed default template or existing template;

modifying the virtual collaborative interface in response to the input received into the virtual collaborative interface from the computers at remote locations;

dynamically updating the added or modified widgets with corresponding streaming time series data from the analyzed data associated with the selected performance issue based on the addition or modification; and saving the collaboratively modified default or existing template.

8. The non-transitory computer-readable storage medium of claim 7, wherein the operations include providing a chat functionality.

9. The non-transitory computer-readable storage medium of claim 7, wherein the widgets include a graph for metrics data and a graph of dynamically streaming time series data.

10. The non-transitory computer-readable storage medium of claim 7, including providing note data received from the computers at remote locations, the note data visually configured to represent a status communicated in a note text.

11. The non-transitory computer-readable storage medium of claim 7, wherein dynamically updating the added or modified widgets with corresponding streaming time series data include scrolling a graphical representation of the streaming time series data as received.

12. The non-transitory computer-readable storage medium of claim 7, wherein the operations include:
saving the configuration of the widgets so as to automatically pre-load the configuration in response to a future selection of the selected performance issue.

13. A system for providing a virtual collaboration interface on a machine, comprising: a processor; a memory; and one or more modules stored in the memory and executable by the processor to perform operations including:
receive, by a collection server, data from agents installed on servers that also include applications that perform a distributed business transaction, the data associated with performance of the distributed business transaction;
analyze, by the collection server, the received data to detect performance issues for the distributed business transaction;
report the detected performance issues including displaying the detected performance issues in a list and a graphical indicator providing a severity level for each performance issue;
receive, from a remote computer, a selection of one of the displayed performance issues in the list and a request to initiate a virtual collaborative interface for the selected performance issue;
in response to receiving the request, dynamically determine whether a template exists for displaying the virtual collaborative interface specifically for the selected performance issue;
in response to the determining, display the virtual collaborative interface using a default template when a template does not exist for the selected performance issue and display the virtual collaborative interface using an existing template when a template does exist for the selected performance issue;
pre-load the default template with one or more widgets or the existing template with one or more widgets previously selected while collaboratively problem solving the same performance issue previously;
populate the pre-loaded one or more widgets in the displayed default template or the existing template with corresponding data from the analyzed data associated with the selected performance issue, the corresponding data populating the pre-loaded one or more widgets associated with the selected performance issue, the data including streaming time series data;
receive input into the virtual collaborative interface from computers at remote locations to collaboratively modify the default or existing template including adding a new widget, modifying the one or more previously selected widgets, or removing the one or more previously selected widgets from the displayed default template or existing template;
modify the virtual collaborative interface in response to the input received into the virtual collaborative interface from the computers at remote locations;
dynamically update the added or modified widgets with corresponding streaming time series data from the analyzed data associated with the selected performance issue based on the addition or modification; and
save the collaboratively modified default or existing template.

14. The system of claim 13, wherein the one or more modules are executable to provide a chat functionality.

15. The system of claim 13, wherein the widgets include a graph for metrics data and a graph of dynamically streaming time series data.

16. The system of claim 13, wherein the one or more modules are executable to provide note data received from the computers at remote locations, the note data visually configured to represent a status communicated in a note text.

17. The system of claim 13, wherein the one or more modules are executable to dynamically update the added or modified widgets with corresponding streaming time series data by scrolling a graphical representation of the streaming time series data as received.

18. The system of claim 13, wherein the one or more modules are executable to save the configuration of the widgets so as to automatically pre-load the configuration in response to a future selection of the selected performance issue.

* * * * *